Patented Jan. 26, 1926.

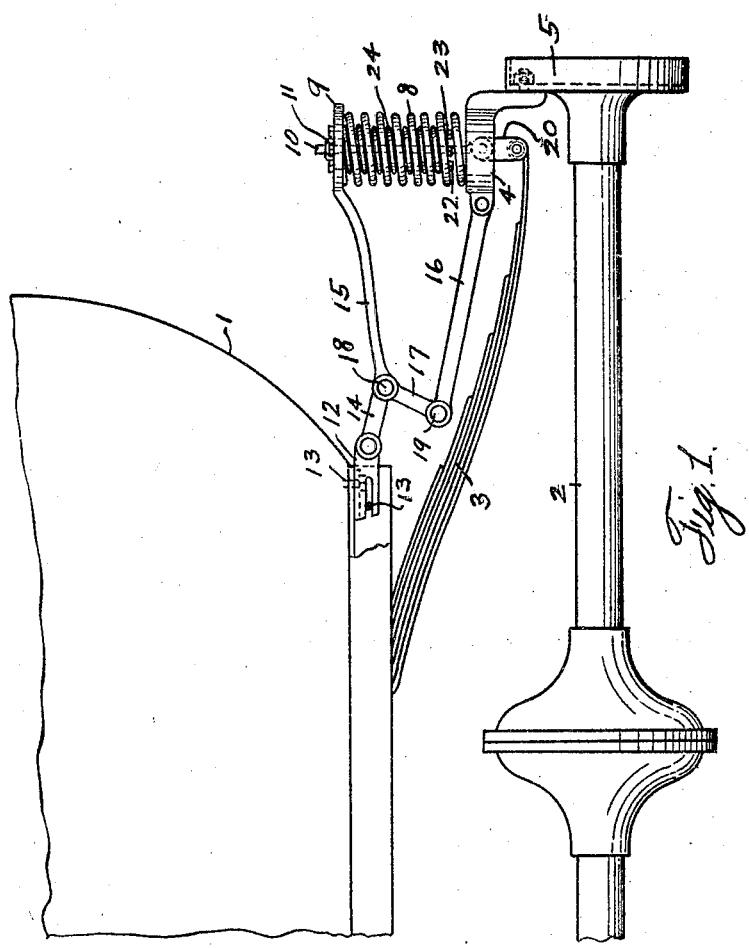

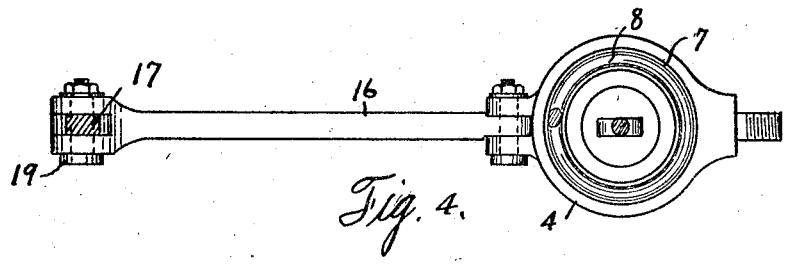
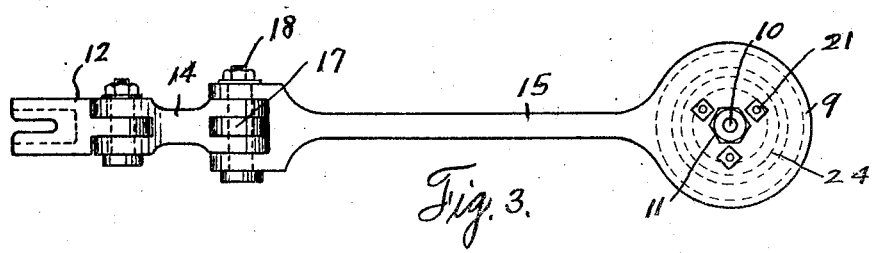
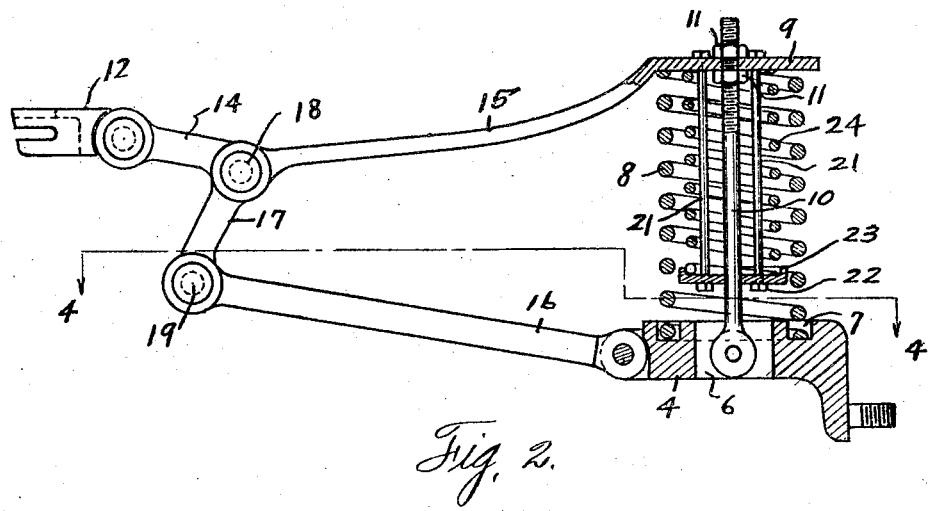

1,571,147

UNITED STATES PATENT OFFICE.

ALBERT E. SCOTT, OF HOUSTON, TEXAS.

SHOCK ABSORBER.

Application filed November 5, 1923. Serial No. 672,749.

*To all whom it may concern:*

Be it known that I, ALBERT E. SCOTT, a citizen of the United States, residing at Houston, in the county of Harris and State of Texas, have invented certain new and useful Improvements in a Shock Absorber, of which the following is a specification.

This invention relates to new and useful improvements in a shock absorber.

One object of the invention is to provide a shock absorber specially designed for application to Ford automobiles and vehicles of similar design.

Another object of the invention is to provide a shock absorber of the character described which is very flexible and will absorb the shocks incident to the movement of the vehicle over rough roads, and which will also take care of the rebound.

With the above and other objects in view, the invention has particular relation to certain novel features of construction, operation and arrangement of parts, an example of which is given in this specification and illustrated in the accompanying drawings, wherein:

Figure 1 shows a fragmentary rear view of a vehicle with the shock absorber applied thereto.

Figure 2 shows an elevation of the absorber, partly in section.

Figure 3 shows a plan view of the absorber; and,

Figure 4 shows a horizontal sectional view taken on the line 4—4 of Figure 2.

Referring now more particularly to the drawings, wherein like numerals of reference designate similar parts in each of the figures, the numeral 1 designates the vehicle body, the numeral 2 refers to the axle, and the numeral 3 refers to the spring one end of which is anchored to the body. There is an annular spring perch 4 secured to the brake housing 5, of the axle 2. This perch has a central opening 6 and around it an annular groove 7 wherein is seated the coil spring 8. This coil spring supports the disc-like plate 9 from which depends the rod 10. This rod is clamped to the plate by means of the clamp nuts 11, 11.

There is a hinge member 12 which is secured to the vehicle body by means of a suitable bolt, or set screws, as 13, and a link 14 is hinged at one end to this member and at its other end said link is hinged to the inwardly extending arm 15, which is formed integrally with the plate 9.

Toggle levers 16 and 17 are provided, the former of which is hinged at one end to the perch 4 and the latter of which is pivoted at one end on the hinge pin 18 which connects the link 14 and arm 15. These toggle levers 16 and 17 are connected together by the hinge pin 19.

The rod 10 depends through the spring 8 and its lower end is connected to the free end of the vehicle spring 3 through the link 20.

Depending from the plate, within the spring 9 are the hanger rods 21 whose lower ends are formed with heads 22, which support the bearing plate 23, slidable on said rods. A rebound spring 24 is interposed between the plates 9 and 23.

Upon downward movement of the body 1 relative axle 2, the spring 8 is first compressed, absorbing part of the shock, and upon further downward movement of said body the bearing plate 23 seats on the perch 4, the rods 21 sliding through said plate, and the spring 24 is placed under compression. Both springs 8 and 24 thus absorb the shock, but on rebound the spring 24 becomes inactive as soon as the bearing plate 23 is lifted from said perch, thus weakening the force of the rebound.

What I claim is:

1. The combination with a vehicle body and a leaf spring supporting said body; of a fixed perch having a central opening; a yieldable means mounted on said perch; said yieldable means including a coil spring supported by said perch; an anchor on said coil spring; a cushion member depending from said anchor within said coil spring; a bearing plate, hanger rods whose upper ends are fixed to said anchor, the lower ends of said rods being slidable through said bearing plate and aligned with said opening, means supporting said plate on said rods, in contact with the lower end of said cushion member, said plate being held normally out of contact with, but adapted to rest upon, said perch; connecting means connected to said anchor, and supported by said yieldable means and also connected to and supporting the outer end of said leaf spring, and means for anchoring said yieldable means on said perch.

2. The combination with a vehicle body, and a leaf spring supporting said body, of a fixed perch; a yieldable means mounted on said perch; said yieldable means including a coil spring supported by said perch; an anchor on said coil spring; and a cushion member depending from said anchor within said coil spring; a bearing plate; hanger rods depending from the anchor and slidable through said plate, said rods holding said plate in contact with the lower end of the cushion member, and normally out of contact with said perch; connecting means connected to said anchor, and supported by said yieldable means, and also connected to and supporting the outer end of said leaf spring; means for anchoring said yieldable means on said perch, said anchoring means including pivotal connections between said perch, said anchor and the vehicle body.

In testimony whereof I have signed my name to this specification.

ALBERT E. SCOTT.